United States Patent
Paz et al.

(10) Patent No.: US 12,244,443 B2
(45) Date of Patent: Mar. 4, 2025

(54) DISCRETE FOURIER TRANSFORM SPREAD ORTHOGONAL FREQUENCY DIVISION MULTIPLEXING WAVEFORM PRE-EQUALIZATION

(71) Applicant: QUALCOMM Incorporated, San Diego, CA (US)

(72) Inventors: Daniel Paz, Atlit (IL); Michael Levitsky, Rehovot (IL); Tom Barak, Rehovot (IL); Assaf Touboul, Netanya (IL); Alexander Sverdlov, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 18/338,059

(22) Filed: Jun. 20, 2023

(65) Prior Publication Data
US 2024/0430145 A1    Dec. 26, 2024

(51) Int. Cl.
*H04L 27/01*    (2006.01)
*H04L 5/00*    (2006.01)

(52) U.S. Cl.
CPC ............ *H04L 27/01* (2013.01); *H04L 5/0023* (2013.01)

(58) Field of Classification Search
CPC ... H04B 7/06; H04B 7/08; H04B 7/10; H04B 7/0413; H04B 7/0417; H04L 1/00; H04L 1/02; H04L 5/00; H04L 5/0023; H04L 5/0048; H04L 27/01; H04L 27/26; H04L 27/28; H04W 24/00; H04W 74/08; H04W 84/00; H04W 88/02

USPC ................ 375/291, 260, 262, 267, 295, 316
See application file for complete search history.

(56) References Cited

U.S. PATENT DOCUMENTS

2018/0139785 A1*   5/2018   Zhang ............... H04W 74/0833
2023/0396476 A1*   12/2023   Kamiya .............. H04L 27/2636

OTHER PUBLICATIONS

Zhou e al. "DCT-based channel estimation techniques for LTE uplink" China (Year: 2009).*

* cited by examiner

*Primary Examiner* — Shawkat M Ali
(74) *Attorney, Agent, or Firm* — Kevin M. Donnelly; Harrity & Harrity, LLP

(57) ABSTRACT

Various aspects of the present disclosure generally relate to wireless communication. Some aspects more specifically relate to discrete Fourier transform spread orthogonal frequency division multiplexing (DFT-S-OFDM) waveform pre-equalization for MIMO communications. A receiver device, such as an extended reality (XR) device, may be configured to offload a portion of data processing to a companion device, such as a user equipment (UE). In some aspects, the UE may generate a DFT-S-OFDM waveform and may apply a pre-equalization to the DFT-S-OFDM waveform. Applying the pre-equalization to the DFT-S-OFDM waveform may include applying a minimum mean square error (MMSE) pre-equalization to the DFT-S-OFDM waveform. The receiver device may receive the pre-equalized DFT-S-OFDM waveform from the UE and may process the pre-equalized DFT-S-OFDM waveform. For example, the receiver device may decode the pre-equalized DFT-S-OFDM waveform without performing fast Fourier transform (FFT) or inverse discrete Fourier transform (IDFT) operations.

29 Claims, 10 Drawing Sheets

DISCRETE FOURIER TRANSFORM SPREAD ORTHOGONAL FREQUENCY DIVISION MULTIPLEXING WAVEFORM PRE-EQUALIZATION

FIELD OF THE DISCLOSURE

Aspects of the present disclosure generally relate to wireless communication and specifically, to techniques and apparatuses for discrete Fourier transform spread orthogonal frequency division multiplexing waveform pre-equalization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

An extended reality (XR) device may need to be lightweight, perform with limited power consumption, and have a reasonable battery life (for example, four hours or eight hours). In some cases, a portion of data processing that is typically performed at the XR device may be offloaded to a companion device, such as a user equipment (UE). The UE may be, for example, a smart phone. The UE may be configured to manage a portion of the data processing on behalf of the XR device, and to transmit processed data to the XR device. This may reduce the processing requirements and power consumption at the XR device. However, signaling between the XR device and the UE may limit the amount of data processing that can be offloaded to the companion device. This may limit the reductions to the XR processing and power consumption, which may result in the XR device being heavier or having a shorter battery life.

SUMMARY

Some aspects described herein relate to a method for wireless communication by a user equipment (UE). The method may include generating a pre-equalized discrete Fourier transform spread orthogonal frequency division multiplexing (DFT-S-OFDM) waveform associated with a multiple-input multiple-output (MIMO) communication system in accordance with applying a minimum mean square error (MMSE) pre-equalization to a DFT-S-OFDM waveform. The method may include transmitting, to a receiver device, the pre-equalized DFT-S-OFDM waveform.

Some aspects described herein relate to a method for wireless communication by a receiver device. The method may include receiving, from a UE, a pre-equalized DFT-S-OFDM waveform associated with a MIMO communication system, the pre-equalized DFT-S-OFDM waveform being pre-equalized in accordance with a MMSE pre-equalization. The method may include processing the pre-equalized DFT-S-OFDM waveform.

Some aspects described herein relate to a UE for wireless communication. The UE may include a processing system that includes one or more processors and one or more memories coupled with the one or more processors. The processing system may be operable to cause the UE to generate a pre-equalized DFT-S-OFDM waveform associated with a MIMO communication system in accordance with applying a MMSE pre-equalization to a DFT-S-OFDM waveform. The processing system may be operable to cause the UE to transmit, to a receiver device, the pre-equalized DFT-S-OFDM waveform.

Some aspects described herein relate to a receiver device for wireless communication. The receiver device may include a processing system that includes one or more processors and one or more memories coupled with the one or more processors. The processing system may be operable to cause the receiver device to receive, from a UE, a pre-equalized DFT-S-OFDM waveform associated with a MIMO communication system, the pre-equalized DFT-S-OFDM waveform being pre-equalized in accordance with a MMSE pre-equalization. The processing system may be operable to cause the receiver device to process the pre-equalized DFT-S-OFDM waveform.

Some aspects described herein relate to a non-transitory computer-readable medium that stores a set of instructions for wireless communication by a UE. The set of instructions, when executed by one or more processors of the UE, may cause the UE to generate a pre-equalized DFT-S-OFDM waveform associated with a MIMO communication system in accordance with applying a MMSE pre-equalization to a DFT-S-OFDM waveform. The set of instructions, when executed by one or more processors of the UE, may cause the UE to transmit, to a receiver device, the pre-equalized DFT-S-OFDM waveform.

Some aspects described herein relate to a non-transitory computer-readable medium that stores a set of instructions for wireless communication by a receiver device. The set of instructions, when executed by one or more processors of the receiver device, may cause the receiver device to receive, from a UE, a pre-equalized DFT-S-OFDM waveform associated with a MIMO communication system, the pre-equalized DFT-S-OFDM waveform being pre-equalized in accordance with a MMSE pre-equalization. The set of instructions, when executed by one or more processors of the receiver device, may cause the receiver device to process the pre-equalized DFT-S-OFDM waveform.

Some aspects described herein relate to an apparatus for wireless communication. The apparatus may include means for generating a pre-equalized DFT-S-OFDM waveform associated with a MIMO communication system in accordance with applying a MMSE pre-equalization to a DFT-S-OFDM waveform. The apparatus may include means for transmitting, to a receiver device, the pre-equalized DFT-S-OFDM waveform.

Some aspects described herein relate to an apparatus for wireless communication. The apparatus may include means for receiving, from a UE, a pre-equalized DFT-S-OFDM waveform associated with a MIMO communication system, the pre-equalized DFT-S-OFDM waveform being pre-equalized in accordance with a MMSE pre-equalization. The apparatus may include means for processing the pre-equalized DFT-S-OFDM waveform.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
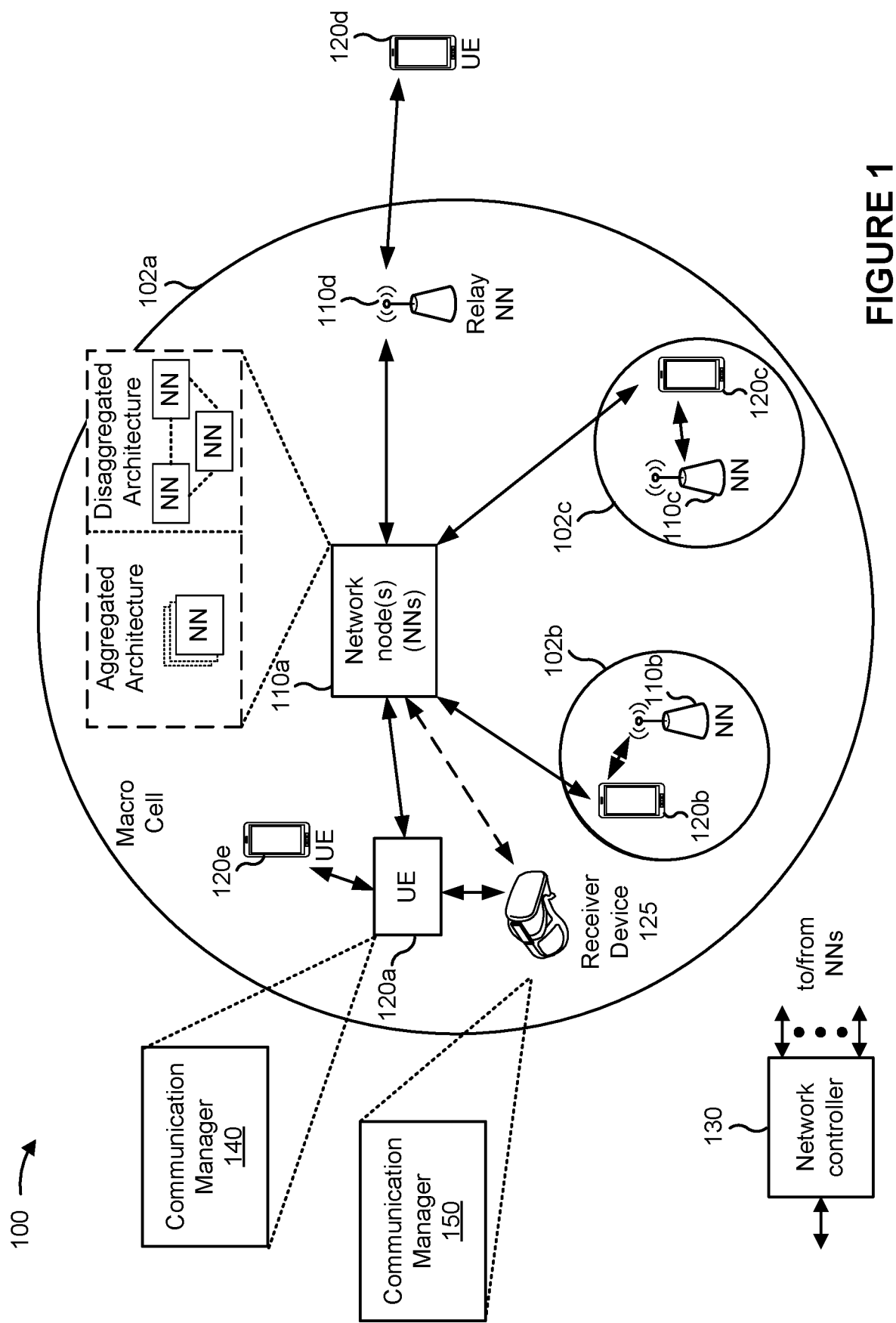
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to wireless communications. Some aspects more specifically relate to discrete Fourier transform spread orthogonal frequency division multiplexing (DFT-S-OFDM) waveform pre-equalization for multiple-input multiple-output (MIMO) communications. A receiver device, such as an extended reality (XR) device, may be configured to offload a portion of data processing that is typically performed by the XR device to a companion device, such as a user equipment (UE). In some aspects, the UE may generate a DFT-S-OFDM waveform and may apply a pre-equalization to the DFT-S-OFDM waveform. Applying the pre-equalization to the DFT-S-OFDM waveform may include applying a minimum mean square error (MMSE) pre-equalization, such as a Tomlinson-Harashima precoder (THP) MMSE pre-equalization, to the DFT-S-OFDM waveform. In some aspects, the MMSE pre-equalization may be in accordance with channel state information (CSI), a thermal noise characteristic, a stationary interference characteristic, or a receiver noise value. In some aspects, the receiver device may transmit information, such as a CSI indication or a receiver noise value measurement, that enables the UE to apply the MMSE pre-equalization to the DFT-S-OFDM waveform. In addition to, or as an alternative to, applying MMSE pre-equalization, the UE may transmit information, such as a spatial layer unbiasing indication or a log-likelihood ratio (LLR) scaling factor indication, associated with a processing of the DFT-S-OFDM waveform by the receiver device. The receiver device may receive and process the pre-equalized DFT-S-OFDM waveform, which may include decoding the pre-equalized DFT-S-OFDM waveform. In some aspects, the receiver device may decode the pre-equalized DFT-S-OFDM waveform without performing fast Fourier transform (FFT) or inverse discrete Fourier transform (IDFT) operations.

Particular aspects of the subject matter described in this disclosure can be implemented to realize one or more of the following potential advantages. In some examples, by generating the pre-equalized DFT-S-OFDM waveform and transmitting the pre-equalized DFT-S-OFDM waveform to the receiver device, the described techniques can be used to offload a portion of processing that is typically performed by a receiver device, such as an XR device, to a companion device, such as a UE. This may reduce or eliminate the need for the receiver device to perform complex decoding operations, such as FFT and IDFT operations. Additionally, this may enable the receiver device to be lightweight, may reduce a power consumption by the receiver device, and may enable the receiver device to have a longer battery life. In some examples, by generating the pre-equalized DFT-S-OFDM waveform and transmitting the pre-equalized DFT-S-OFDM waveform to the receiver device, the described techniques can be used to reduce signaling overhead between the receiver device and the UE, and/or may enable a lower peak-to-average power ratio (PAPR) for the signaling between the receiver device and the UE. These advantages, among others, are described in more detail below.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

In some examples, the wireless network 100 may include a receiver device 125. The receiver device 125 may be, for example, an XR device. The receiver device 125 may communicate with the UE 120. For example, the receiver device 125 may perform a portion of data processing on behalf of the UE 120. Additionally or alternatively, the receiver device 125 may communicate with the network node 110.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHz." if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may generate a pre-equalized DFT-S-OFDM waveform associated with a MIMO communication system in accordance with applying an MMSE pre-equalization to a DFT-S-OFDM waveform; and transmit, to a receiver device, the pre-equalized DFT-S-OFDM waveform. Additionally or alternatively, the communication manager 140 may perform one or more other operations described herein.

In some aspects, the receiver device 125 may include a communication manager 150. As described in more detail elsewhere herein, the communication manager 150 may receive, from a UE, a pre-equalized DFT-S-OFDM waveform associated with a MIMO communication system, the pre-equalized DFT-S-OFDM waveform being pre-equalized in accordance with an MMSE pre-equalization; and process the pre-equalized DFT-S-OFDM waveform. Additionally or alternatively, the communication manager 150 may perform one or more other operations described herein.

Figure 2:
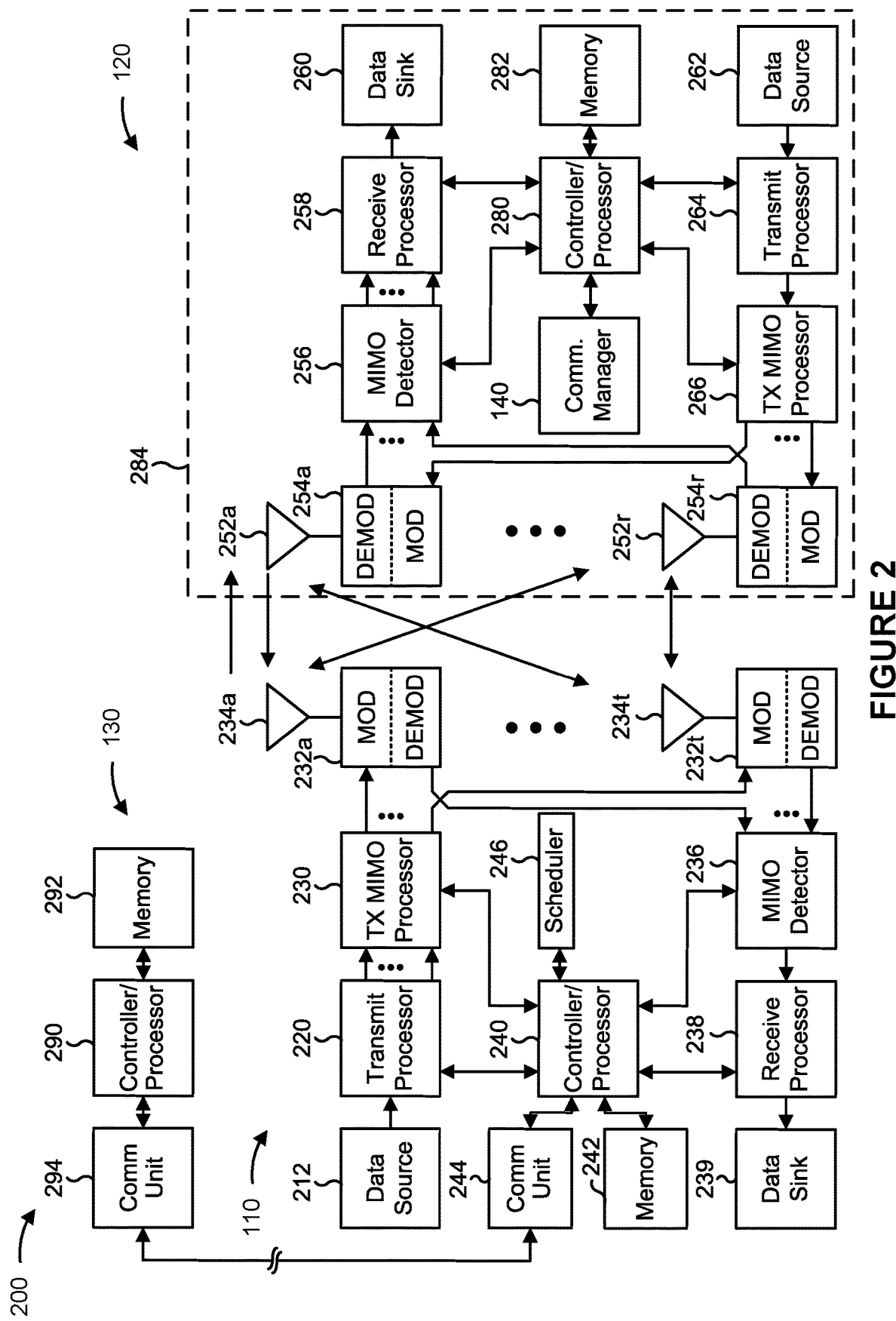
FIG. 2 is a diagram illustrating an example network node in communication with a user equipment (UE) in a wireless network in accordance with the present disclosure.

FIG. 2 is a diagram illustrating an example 200 of a network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R ≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP. RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with DFT-S-OFDM pre-equalization, as described in more detail elsewhere herein. For example, the controller/processor 240 of the network node 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, the UE 120 includes means for generating a pre-equalized DFT-S-OFDM waveform associated with a MIMO communication system in accordance with applying an MMSE pre-equalization to a DFT-S-OFDM waveform; or means for transmitting, to a receiver device, the pre-equalized DFT-S-OFDM waveform. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the receiver device 125 includes means for receiving, from a UE, a pre-equalized DFT-S-OFDM waveform associated with a MIMO communication system, the pre-equalized DFT-S-OFDM waveform being pre-equalized in accordance with an MMSE pre-equalization; or means for processing the pre-equalized DFT-S-OFDM waveform. In some aspects, the means for the receiver device 125 to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
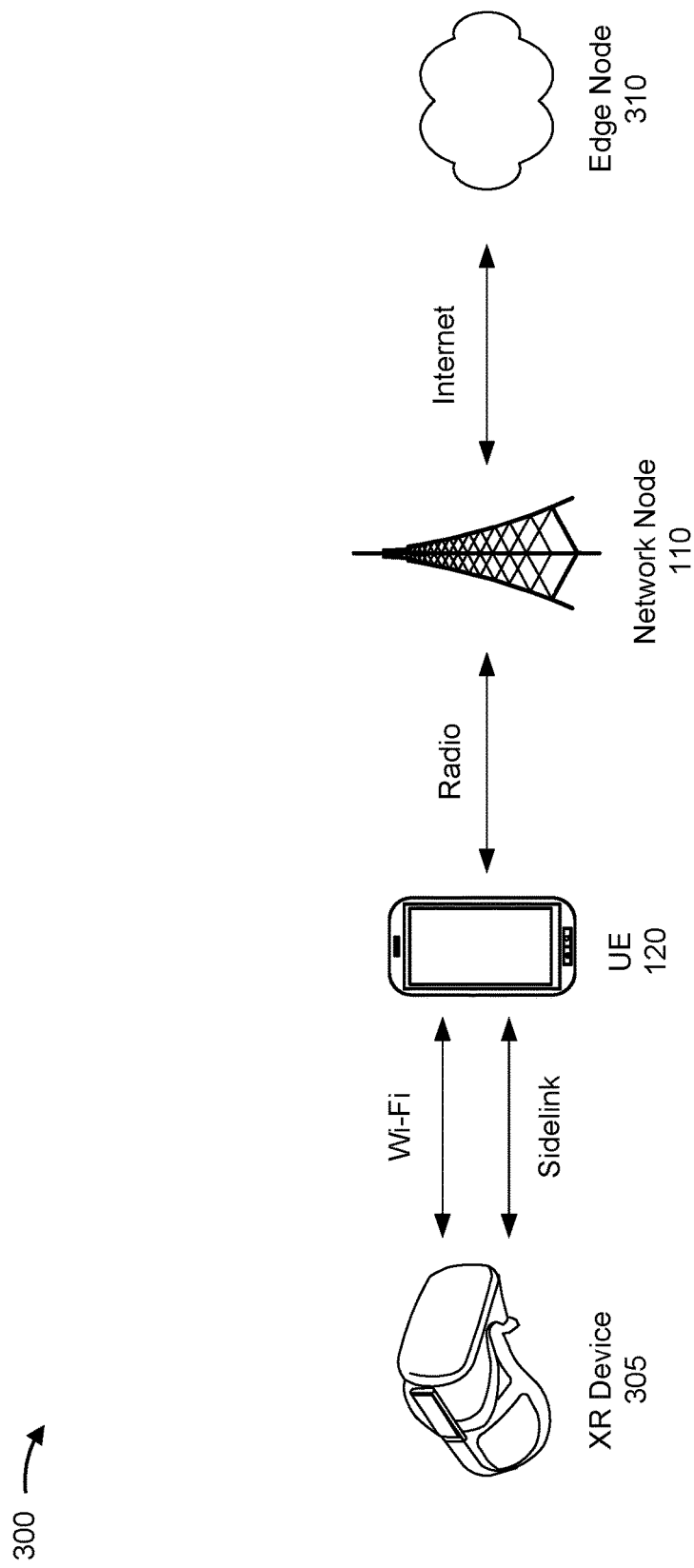
FIG. 3 is a diagram illustrating an example of extended reality communications in accordance with the present disclosure.

FIG. 3 is a diagram illustrating an example 300 of XR communications in accordance with the present disclosure.

An XR device may be a virtual reality (VR) device, an augmented reality (AR) device, or a mixed reality (MR) device. In some cases, the XR device may be a VR headset or AR glasses. The XR device may be compatible with one or more other devices, such as a UE or a puck. A puck may be any device that performs some or all of the processing functions on behalf of the XR device. The UE or the puck may be, for example, a smart phone, a smart watch, or wireless earbuds. In some cases, the XR device may need to be lightweight. For example, a weight of the AR glasses may need to be appropriate for long-time use "on the go" and may (or need to) be similar to ordinary glasses (for example, 30-40 grams). In some cases, the XR device may have limited processing complexity and power consumption, such as in accordance with a heat dissipation capability of the XR device. A rate of heat dissipation by the XR device may be slower than a rate of heat dissipation by the UE or the puck, for example, since the rate of heat dissipation is related to a surface area of the device. In one example, a power consumption limit that is based at least in part on a heat dissipation capability of the AR glasses may be limited to a few watts. In some cases, the XR device may need to have a limited power consumption to allow for a lightweight battery and a reasonable battery lifetime. In some cases, these requirements (for example, light weight, limited processing complexity, and reduced power consumption) for the XR device may be difficult to achieve, for example, due to heavy processing requirements of XR applications. A standalone XR device may not be able to comply with the above requirements and may only be relevant for specific applications and short time usage scenarios which allow the XR device to assume a higher form factor, such as in the case of a head mounted device (HMD).

In some cases, a portion of the XR-related processing may be moved to a companion device, such as the UE or the puck. This may be referred to as a split XR approach and may reduce complexity on the side of the XR device. An example split XR approach may include moving some (for example, most) of the rendering related processing to a companion device, such as the UE or the puck. However, some processing functions may still need to be performed by the XR device for different end-to-end (E2E) considerations, such as a photon-to-motion latency requirement, an XR-to-companion-device wireless link capacity, and a communication link power consumption for long range links, among other examples. In some cases, even though the XR split approach may reduce power consumption at the XR device, the power consumption at the XR device may still be too high, even for less demanding video qualities and less demanding applications. Therefore, the XR split approach may not always allow the XR device to meet the above requirements, particularly in the case of technologically limiting factors and demanding XR applications (for example, frames-per-second (fps) greater than or equal to 120 fps) and video formats greater than or equal to 8K).

In one example, an XR split may be used for long-range communication links over a licensed spectrum with tight scheduling and staggering among different XR users of the XR device. In this case, capacity-per-user may be the primary limitation, and correspondingly, the XR device may need to employ some sensor processing locally to reduce uplink (UL) data volume, and the additional critical sensor and camera data from the XR UL and the rendered video for the XR device (downlink (DL)) may be compressed with a high compression factor (for example, due to a limited link capacity per user). Data pre-processing by a sensor of the XR device and video compression with a high compression factor (for example, a high profile H.264) may have high complexity (particularly for the encoder side) and may require extensive double data rate (DDR) usage for both transmission (Tx) and reception (Rx) path video processing. Due to a photon-to-motion latency requirement and network-node-based split related latencies, receiver-side processing at the XR device may include asynchronous time wrapping (ATW) for last-moment image alignment with the latest pose information.

In another example, a split XR may be used for XR processing offloading with tethering to a relatively close companion device (for example, the UE or the puck) or a processing split between the XR device, the companion device, and a network node. As shown in the example 300, an XR device 305 may communicate with a UE 120 via Wi-Fi (for example, Wi-Fi-D) or via sidelink (for example, via 5G sidelink). The UE 120 may communicate with a network node 110 (for example, a base station) via radio communications (for example, 5G NR communications). The network node 110 may communicate with an edge node 310 (for example, a cloud) via the Internet. From the XR device perspective, the above split assumes a similar processing load and locally covered functionality on the XR device side but with a local short range communication link with the associated UE (for example, 5G NR sidelink or Wi-Fi) which allows for reductions to modem related power consumption. When employing an aggressive XR functionality split (for example, moving most of the processing to a companion device, such as the UE, the puck, or the network node), the XR device may function mostly as an input/output (I/O) device. This may be followed across all of the functional components of the XR device, such as the physical layer (PHY) and modem.

Figure 4:
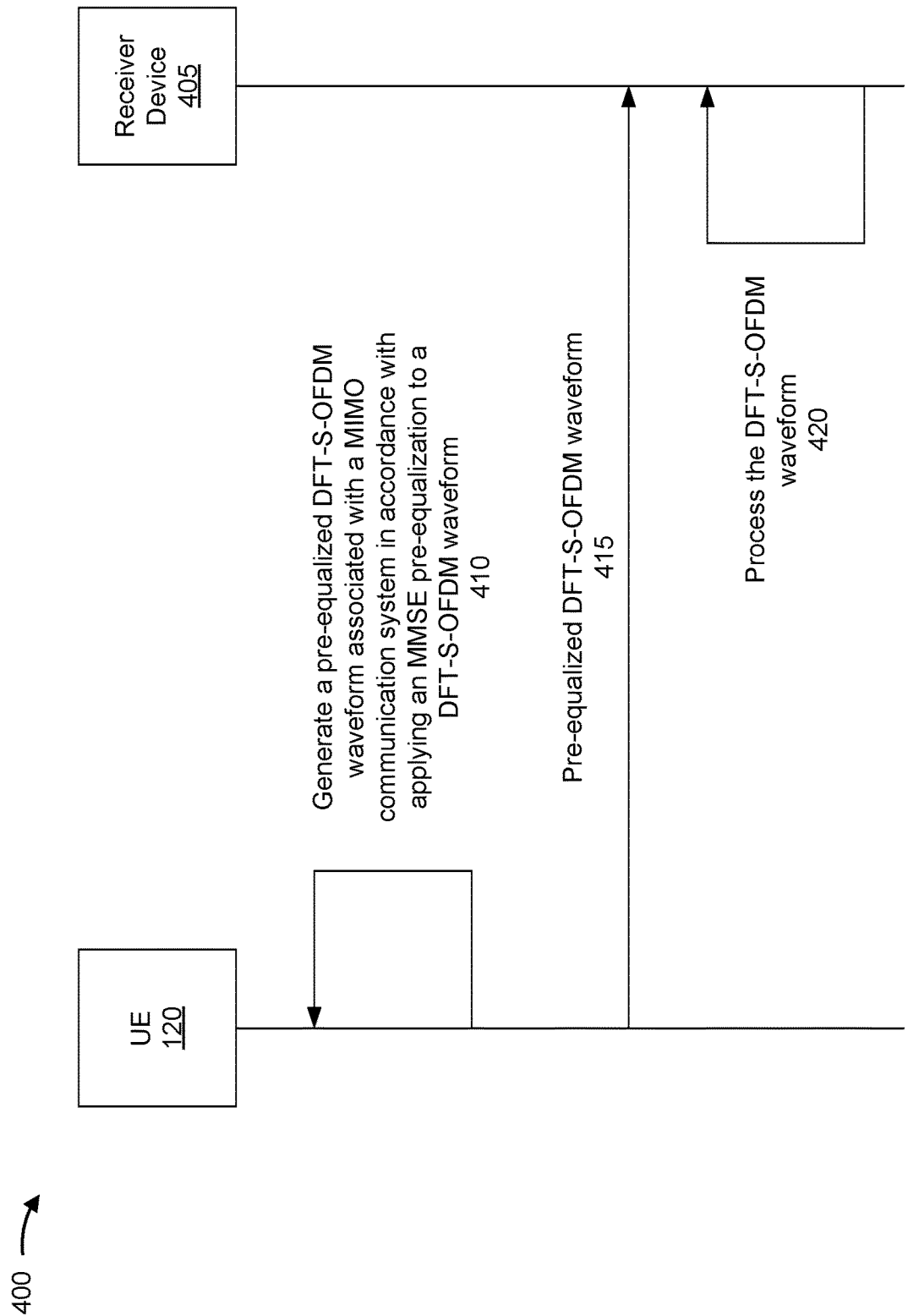
FIG. 4 is a diagram illustrating an example of discrete Fourier transform spread orthogonal frequency division multiplexing waveform pre-equalization in accordance with the present disclosure.

FIG. 4 is a diagram illustrating an example 400 of DFT-S-OFDM waveform pre-equalization in accordance with the present disclosure. The UE 120 may communicate with a receiver device 405. In some aspects, the receiver device 405 may be an XR device.

As shown in a first operation in accordance with reference number 410, the UE 120 may generate a pre-equalized DFT-S-OFDM waveform associated with a MIMO communication system. Generating the pre-equalized DFT-S-OFDM waveform may include applying an MMSE pre-equalization to the DFT-S-OFDM waveform. To allow for complexity reduction at the receiver device side while maintaining a high level of performance, the MMSE pre-equalization may be applied to the DFT-S-OFDM waveform in the MIMO system. When using a DFT-S-OFDM waveform and a discrete Fourier transform (DFT) and precoding size at the receiver device that are equal to an inverse fast Fourier transform (IFFT) size at the UE 120, FFT and IDFT modules at the receiver device 405 may not need to be used (for example, may not be included in the receiver device 405). This may allow for additional power reduction compared to analogous OFDM systems, particularly for a large allocation size (for example, for ultra-wideband (UWB) communications with bands restricted to a minimum UWB transmission bandwidth of 500 MHz, which may require a larger FFT size). Additionally, UE-to-receiver-device signaling may be reduced compared to OFDM systems since DFT-S-OFDM may only require a single LLR scaling coefficient per layer, while OFDM may require an LLR scaling coefficient per resource element (RE).

In some aspects, MMSE pre-equalization (such as Tx MMSE pre-equalization or THP MMSE pre-equalization) may be in accordance with CSI or one or more receiver-device-side stationary noise characteristics (such as a thermal noise statistic, a stationary interference characteristic, or a receiver noise value (Rnn)). In some aspects, the receiver device 405 may transmit, and the UE 120 may receive, an indication of the receiver noise value.

In some aspects, such as when Tx pre-equalization is used, the UE 120 may transmit LLR scaling factors to the receiver device 405 per-RE or per physical resource group (PRG). Alternatively, LLR scaling per RE or PRG (for example, in the case of pre-equalized OFDM) can be evaluated on the receiver device side based at least in part on a dedicated reference signal. In both cases, for OFDM-based Tx pre-equalization, there may be overhead related to LLR scaling acquisition with a reasonable tracking ability. In the example of pre-equalized DFT-S-OFDM, an LLR scaling factor may be a scaling factor that is applied per-layer (for example, that is the same for all data symbols of the layer), and may not be RE-or-PRG-index-dependent. Correspondingly, coupling of the Tx pre-equalization may enable reductions to LLR scaling-related overhead compared to pre-equalized OFDM (for example, signaling of scaling coefficients from UE-to-XR or allocation of dedicated reference signals for local LLR scaling evaluation on the XR device side may have reduced complexity). In some aspects, LLR scaling (for example, two coefficients) may be signaled per-CSI or per-equalizer-refresh via downlink control information (DCI) of a first resource allocation after the equalizer refresh.

In some aspects, pre-equalization may be employed in accordance with corresponding capabilities on the paired UE and receiver device sides. The UE 120 may be configured to support pre-equalization (for example, THP pre-equalization) and to provide indications or information to the receiver device 405 associated with supporting simplified Rx procedures on the receiver device side. In some aspects, the receiver device 405 may be configured to provide, to the UE 120, information that enables Tx pre-equalization to be performed by the UE 120. For example, the receiver device 405 may provide, to the UE 120, full or partial CSI information or receiver-device-side Rnn measurements. In some aspects, the receiver device 405 may be configured to receive, from the UE 120, information for Rx-side processing with Tx pre-equalization employed. For example, the receiver device 405 may receive, from the UE 120, Rx sample scaling information, spatial layer unbiasing information, or LLR scaling information. In some aspects, the receiver device 405 be configured to combine the information received from the UE 120 with one or more local measurements performed by the receiver device 405 to be used in Rx processing or decoding. For example, LLR scaling may be performed in accordance with local receiver-device-side post-processing error vector magnitude (EVM), noise, and interference measurements.

As shown in a second operation in accordance with reference number 415, the UE 120 may transmit, and the receiver device 405 may receive, the pre-equalized DFT-S-OFDM waveform.

As shown in a third operation in accordance with reference number 420, the receiver device 405 may process the pre-equalized DFT-S-OFDM waveform. Processing the pre-equalized DFT-S-OFDM waveform may include decoding the pre-equalized DFT-S-OFDM waveform.

In some aspects, the receiver device 405 may decode the pre-equalized DFT-S-OFDM waveform without performing FFT or IDFT operations. In some aspects, removing the FFT component from the receiver device 405 may be possible when a DFT precoding size is equal to an IFFT size at the UE 120. Otherwise, the IFFT operation at the UE 120 may not result in transmitting a data symbol per time sample (with a sampling rate aligned with the IFFT size used on the UE-side) and FFT operations followed by the IDFT operation may be needed on the receiver device side to reconstruct data symbols. This restriction may be less limiting on UWB channels, for example, since UWB may not have regulations for out-of-band (OOB) emissions or in-band (IB) emissions. In the example of XR sidelink communications over a UWB channel, there may be no multi-user data transmission from the same transmitter (UE), and therefore, there may be no need to differentiate between DFT and FFT size for frequency division multiplexing (FDM) of several user signals on the same UWB channel or component carrier. In some aspects, information associated with these restrictions may be transmitted by the receiver device 405 to the UE 120 via a radio resource control (RRC) message.

In some aspects, activation or deactivation of the FFT component at the receiver device 405 may be coupled to a dynamically configurable pre-equalizer (for example, via DCI or a medium access control (MAC) control element (CE) (MAC-CE)) or the RRC indication that the DFT precoding size is equal to the IFFT size. If size restriction is enabled, DFT-S-OFDM pre-equalization may be assumed not to require an FFT operation at the receiver device side. If receiver-device-side MMSE equalization is dynamically configured, receiver-device-side FFT components may be activated. This may be required for a channel acquisition phase where no pre-equalization is applied or may be required as a fallback mechanism for cases where the CSI is outdated (for example, under Doppler conditions).

In some aspects, a linear pre-equalization (such as Tx MMSE pre-equalization) may be used instead of a non-linear pre-equalization (such as THP pre-equalization). Tx MMSE pre-equalization may require lower complexity on the receiver device side compared to THP MMSE pre-equalization, for example, since there may be no need for a modulo operation to be performed by the receiver device 405. Thus, in signal-to-noise ratio (SNR) regions where both pre-equalization types achieve similar performances, Tx MMSE pre-equalization may be used.

Figure 5:
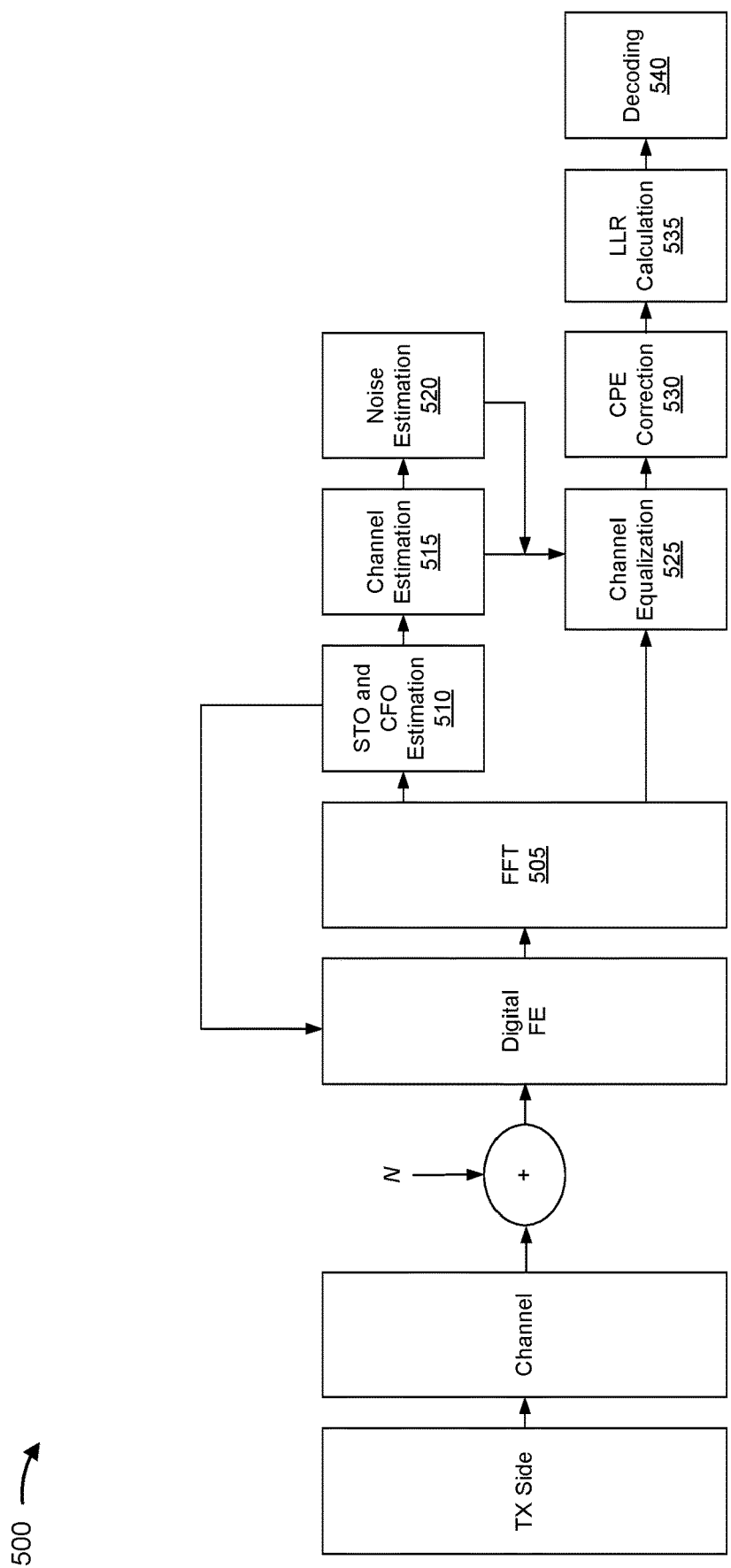
FIG. 5 is a diagram illustrating an example of a receiver device architecture in accordance with the present disclosure.

FIG. 5 is a diagram illustrating an example 500 of a receiver device architecture in accordance with the present disclosure. The receiver device may be the receiver device 405 described in FIG. 4. As shown in the example 500, multiple receiver device PHY modules may be degenerated or effectively shifted to the transmitter side of the link from the XR side up to the point where only very limited processing is required on the XR modem side to achieve a very significant Rx modem complexity and power consumption reduction. In some examples, the receiver device may be configured to obtain CSI knowledge associated with a channel between the receiver device and the transmitter device. This may be achieved with channel reciprocity or without channel reciprocity using, for example, a low-latency time-division duplexing (TDD) pattern, full-duplex, or sub-band full-duplex. In some examples, continuous UL and DL channels (for example, with low-latency TDD patterns, single-frequency full-duplex (SFFD), or sub-band full-duplex (SBFD)/frequency division duplexing (FDD)) may be assumed to allow the PHY approach where most of the Rx baseband (BB) processing-related complexity is shifted to the transmitter side for XR device complexity and power consumption reduction.

An FFT component 505 may receive data from a digital frequency estimation (FE) component. The FFT component 505 may be configured to perform an FFT operation on the data. In some examples, the operations of the FFT component 505 may be able to be eliminated in accordance with a DFT-S-OFDM waveform being used. Data symbol processing on the receiver side may be performed in the time domain. This may assume that FFT and DFT are of the same size, and no other XR user signal multiplexing in the frequency domain on the same component carrier (CC) or UWB sub-channel. Thus, in some examples, the operations of the FFT component 505 may be reduced or eliminated at the receiver device (for example, the XR device).

A symbol timing offset (STO) and a carrier frequency offset (CFO) component 510 may be configured to perform symbol timing offset and carrier frequency offset operations. The symbol timing offset operation may include identifying an accurate time associated with a signal being received from the transmitter device (for example, the UE or the puck). In some examples, the time may be identified in accordance with a cyclic prefix included in an OFDM symbol. The carrier frequency offset operation may include identifying a difference between a transmitted carrier frequency and a receiver local oscillator frequency. In some examples, STO and CFO estimation and synchronization loop management for XR may be performed on the transmitter side with correction updates indicated by the transmitter to the paired XR device to be applied locally.

A channel estimation component 515 may be configured to estimate one or more characteristics of a channel between the receiver device (for example, the XR device) and the transmitter device (for example, the UE or the puck). In some examples, the channel estimation may be performed at the transmitter side (rather than at the receiver side) for reciprocal channels (for example, full-duplex or TDD), or may be distributed between the receiver side and the transmitter side for non-reciprocal channels (for example, FDD/SBFD) with only channel sampling being performed at the receiver side.

A noise estimation component 520 may be configured to estimate noise in the channel between the receiver device and the transmitter device. In some examples, Rnn/noise variance may be indicated to the transmitter device to be addressed in the pre-coding. With the equalization being shifted to the transmitter side, the receiver device may not need to perform local channel whitening or incremental redundancy combining (IRC).

A channel equalization component 525 may be configured to perform channel equalization. For example, the channel equalization component 525 may be configured to mitigate effects of channel distortion and to improve the accuracy of received signals on the channel between the receiver device and the transmitter device. In some examples, the channel equalization operations may be moved to the transmitter side. For example, the receiver device may not need to perform channel equalization in accordance with the transmitter device performing a pre-equalization of the DFT-S-OFDM waveform.

A carrier phase estimation (CPE) correction component 530 may be configured to perform carrier phase estimation and correction. For example, the CPE component 530 may estimate a carrier phase and correct the carrier phase for a signal transmitted via the channel between the transmitter device and the receiver device.

An LLR calculation component 535 may be configured to perform LLR calculation. In some examples, the LLR calculation component 535 may be configured to calculate and apply an LLR scaling factor to a signal.

A decoding component 540 may be configured to decode data. For example, the decoding component may be configured to decode an output of the LLR calculation component 535, which may correspond to the pre-equalized DFT-S-OFDM waveform.

In some examples, a low-complexity decoding scheme may be used for decoding the DFT-S-OFDM waveform.

Figure 6:
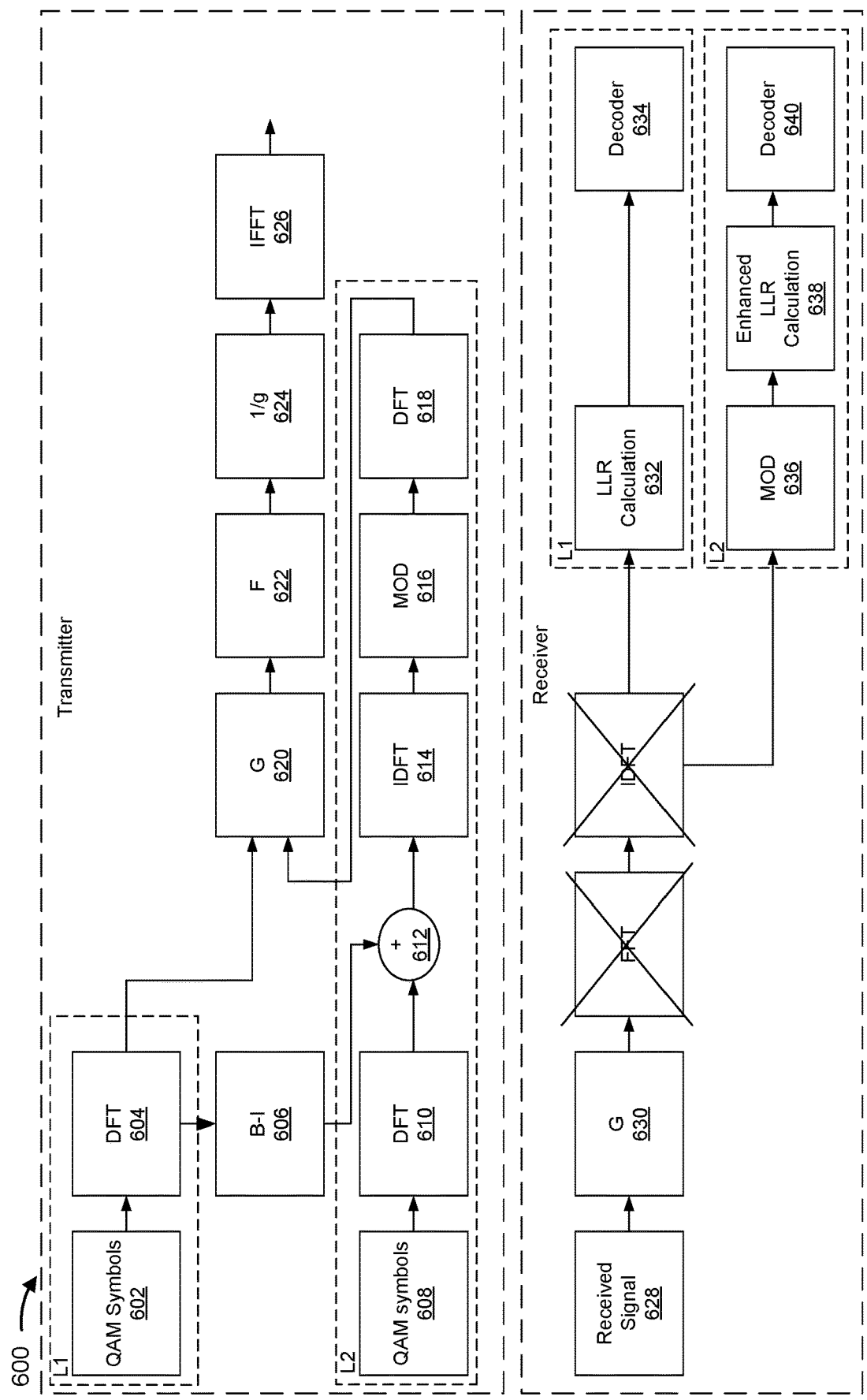
FIG. 6 is a diagram illustrating an example of pre-equalization in accordance with the present disclosure.

FIG. 6 is a diagram illustrating an example 600 of THP pre-equalization in accordance with the present disclosure. As described herein, a transmitter (Tx) device (for example, a UE or a puck) may transmit a pre-equalized DFT-S-OFDM waveform to a receiver device (for example, an XR device). In some examples, the pre-equalization may be a THP pre-equalization. The goal of Tx pre-equalization may be to eliminate Rx side equalization complexity by applying signal pre-equalization on the Tx side. THP pre-equalization may include applying a known interference (for example, spatial inter-layer or multipath-related inter-symbol interference (ISI)) pre-cancellation at the Tx side using a feedback filter, followed by a feedforward filter for channel pre-equalization. The possible power boosting that might be caused by the feedback filter is limited with a modulo operator applied on its output on the Tx side. In some examples, another modulo is be used on the Rx side. In order to preserve the allowed transmission power limit, there are two Tx scaling options: total power scaling across all antennas or per-antenna maximum power restriction/scaling. Such Tx scaling causes Rx noise enhancement and Tx pre-equalization that may require less Tx scaling and may enable operation with a higher overall link SNR. Due to the modulo operation, THP may result in less Tx power increases, and therefore may have better Tx pre-equalization/self-interference (and ISI in case of DFT-S-OFDM/SC) mitigation abilities by adopting a successive interference cancellation (SIC)-based pre-equalizer on the Tx side. In some examples, THP may result in a modulo loss in low SNR scenarios. This modulo loss may be mitigated by employing an enhanced LLR calculation with cyclic shift symbol or constellation expansion to account for potential modulo-related noise wrapping. In one example, a THP MMSE operation may be as follows:

$H+\varepsilon(H^\dagger)^H = LQ.$ $G = \text{diag}(\{L\}_{ii}^{-1}),$ $B = LG,$ and $F = Q^H.$ If H is $M_{Rx} \times N_{Tx}$ matrix, then $H^\dagger = H^H(HH^H)^{-1}, M \leq N,$ $H^\dagger = H^{-1}, M = N,$ or $H^\dagger = (H^H H)^{-1} H^H, M \geq N;$ and $$\varepsilon = \frac{\sigma_N^2}{\sigma_{\frac{2}{X}}}.$$

A THP pre-equalization scheme for two-layer MIMO with DFT-s-OFDM is shown in the example 600. At the transmitter side, quadrature amplitude modulation (QAM) symbols 602 associated with Layer 1 (L1) may be provided to a DFT component 604. The DFT component 604 associated with L1 may provide an output to a B-I component 606. The B-I component may be a cross-layer interference cancellation matrix (for example, a channel-dependent matrix) frequency selective Tx SIC in the frequency domain. QAM symbols 608 associated with Layer 2 (L2) may be provided to a DFT component 610. The DFT component 610 associated with L2 may provide an output to an adder 612. The adder 612 may combine the output of the B-I component 606 and the output of the DFT component 610. An output of the adder 612 may be provided to an IDFT component 614. The IDFT component 614 may provide an output to a modulation (MOD) component 616. The MOD component 616 may provide an output to a DFT component 618. The DFT component 618 may provide an output to a G component 620. The G component 620 may perform per layer scaling (for example, for a channel dependent matrix). The G component 620 may provide an output to an F component 622. The F component 622 may include a feed-forward equalization matrix (for example, a channel-dependent matrix). The F component 622 may provide an output to a 1/g component 624. The g may be a transmission scaling factor (for example, to comply with total or per-antenna transmission power restriction). The 1/g component 624 may provide an output to an IFFT component 626. The IFFT component 626 may output data, such as a pre-equalized DFT-S-OFDM waveform.

At the receiver side, a received signal 628 may be provided to a G component 630. The received signal 628 may be, for example, the pre-equalized DFT-S-OFDM waveform. As shown in the example 600, the FFT and IDFT components at the receiver-side may be removed from the overall flow, which may allow for complexity and power consumption reduction on receiver side (for example, the XR side). An L1 LLR calculation component 632 may receive an input (for example, corresponding to an output of the G component 630), and may provide an output to an L1 decoder 634. An L2 MOD component 636 may receive an input (for example, corresponding to an output of the G component 630) and may provide an output to an L2 enhanced LLR calculation component 638. The L2 enhanced LLR calculation component 638 may provide an output to an L2 decoder 640. As described herein, a difference in using THP pre-equalization in DFT-s-OFDM (compared to regular OFDM) is that the modulo operation following the frequency domain SIC is performed in the time domain and not in the frequency domain as in the case of OFDM (for example, the modulo should be applied in the domain of data constellation symbols).

Figure 7:
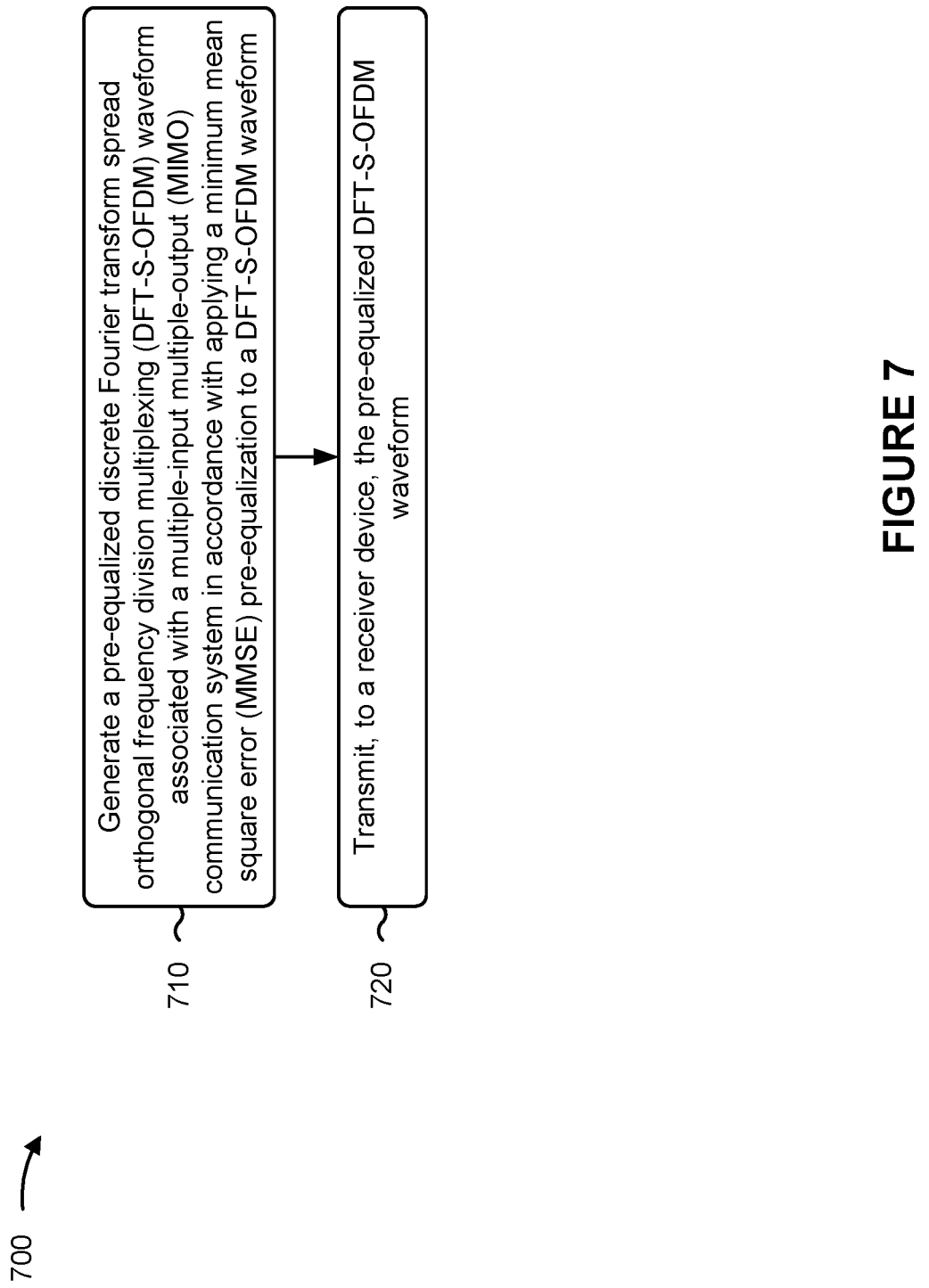
FIG. 7 is a flowchart illustrating an example process performed, for example, by a UE that supports wireless communications in accordance with the present disclosure.

FIG. 7 is a flowchart illustrating an example process 700 performed, for example, by a UE that supports wireless communications in accordance with the present disclosure. Example process 700 is an example where the UE (for example, UE 120) performs operations associated with DFT-S-OFDM pre-equalization.

As shown in FIG. 7, in some aspects, process 700 may include generating a pre-equalized DFT-S-OFDM waveform associated with a MIMO communication system in accordance with applying an MMSE pre-equalization to a DFT-S-OFDM waveform (block 710). For example, the UE (such as by using communication manager 140 or generation component 910, depicted in FIG. 9) may generate a pre-equalized DFT-S-OFDM waveform associated with a MIMO communication system in accordance with applying an MMSE pre-equalization to a DFT-S-OFDM waveform, as described above.

As further shown in FIG. 7, in some aspects, process 700 may include transmitting, to a receiver device, the pre-equalized DFT-S-OFDM waveform (block 720). For example, the UE (such as by using communication manager 140 or transmission component 904, depicted in FIG. 9) may transmit, to a receiver device, the pre-equalized DFT-S-OFDM waveform, as described above.

Process 700 may include additional aspects, such as any single aspect or any combination of aspects described below or in connection with one or more other processes described elsewhere herein.

In a first additional aspect, the MMSE pre-equalization is associated with channel state information for a channel between the UE and the receiver device, a thermal noise characteristic associated with the receiver device, a stationary interference characteristic associated with the receiver device, and a receiver noise value.

In a second additional aspect, alone or in combination with the first aspect, process 700 includes receiving, from the receiver device, an indication of the receiver noise value.

In a third additional aspect, alone or in combination with one or more of the first and second aspects, process 700 includes obtaining, by the UE, an indication that a size of an IFFT performed at the UE is to be equal to a precoding size of a DFT performed at the receiver device.

In a fourth additional aspect, alone or in combination with one or more of the first through third aspects, process 700 includes transmitting, to the receiver device, radio resource control information that indicates that the size of the IFFT performed at the UE is to be equal to the precoding size of the DFT performed at the receiver device.

In a fifth additional aspect, alone or in combination with one or more of the first through fourth aspects, process 700 includes transmitting, to the receiver device, a LLR scaling factor associated with the pre-equalized DFT-S-OFDM waveform.

In a sixth additional aspect, alone or in combination with one or more of the first through fifth aspects, transmitting the LLR scaling factor comprises transmitting the LLR scaling factor for each resource element of a plurality of resource elements or for each physical resource group of a plurality of physical resource groups.

In a seventh additional aspect, alone or in combination with one or more of the first through sixth aspects, transmitting the LLR scaling factor comprises transmitting the LLR scaling factor for each layer of a plurality of layers.

In an eighth additional aspect, alone or in combination with one or more of the first through seventh aspects, transmitting the LLR scaling factor comprises transmitting the LLR scaling factor, via downlink control information associated with a first resource allocation after a refresh operation, for each channel state information indication of a plurality of channel state information indications or for each equalizer refresh operation of a plurality of equalizer refresh operations.

In a ninth additional aspect, alone or in combination with one or more of the first through eighth aspects, process 700 includes obtaining capability information that indicates MMSE pre-equalization capabilities associated with a pairing between the UE and the receiver device, wherein applying the MMSE pre-equalization to the DFT-S-OFDM waveform comprises applying the MMSE pre-equalization to the DFT-S-OFDM waveform in accordance with the capability information.

In a tenth additional aspect, alone or in combination with one or more of the first through ninth aspects, process 700 includes receiving, from the receiver device, information that enables the UE to apply the MMSE pre-equalization to the DFT-S-OFDM waveform, wherein the information that enables the UE to apply the MMSE pre-equalization to the DFT-S-OFDM waveform comprises at least one of channel state information or a receiver noise value measurement.

In an eleventh additional aspect, alone or in combination with one or more of the first through tenth aspects, process 700 includes transmitting, to the receiver device, information associated with a processing of the pre-equalized DFT-S-OFDM waveform by the receiver device, wherein the information comprises at least one of a receiver device sample scaling indication, a spatial layer unbiasing indication, or a log-likelihood ratio scaling factor indication.

In a twelfth additional aspect, alone or in combination with one or more of the first through eleventh aspects, process 700 includes transmitting, to the receiver device, an indication for the receiver device to process the information in accordance with one or more local measurements performed by the receiver device.

In a thirteenth additional aspect, alone or in combination with one or more of the first through twelfth aspects, the MMSE pre-equalization is a THP-based MMSE pre-equalization.

In a fourteenth additional aspect, alone or in combination with one or more of the first through thirteenth aspects, the receiver device is an extended reality device.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
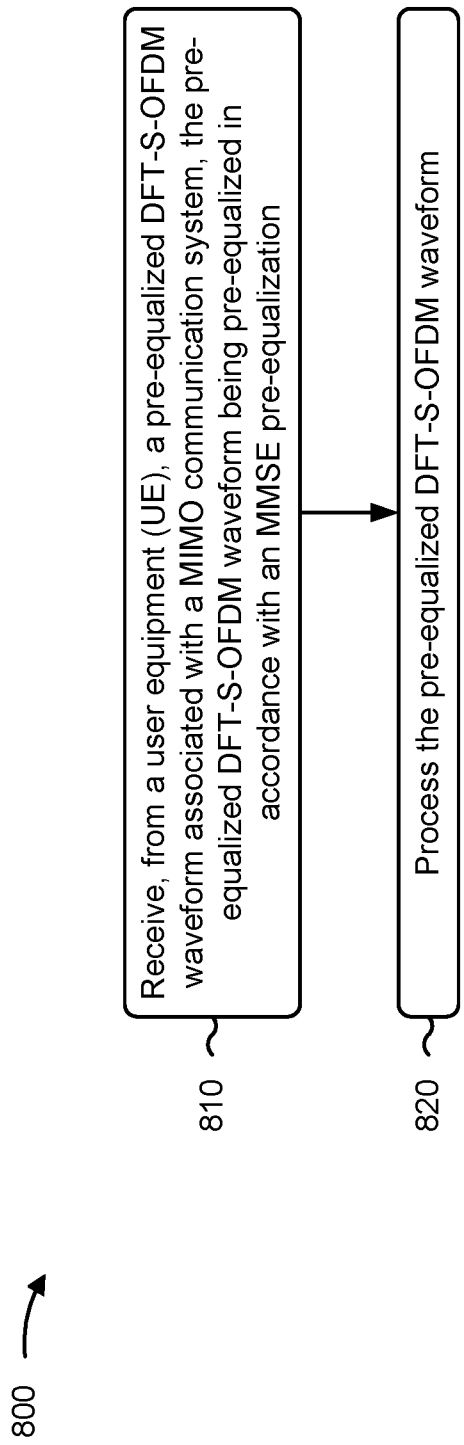
FIG. 8 is a flowchart illustrating an example process performed, for example, by a receiver device that supports wireless communications in accordance with the present disclosure.

FIG. 8 is a flowchart illustrating an example process 800 performed, for example, by a receiver device that supports wireless communications in accordance with the present disclosure. Example process 800 is an example where the receiver device (for example, receiver device 125 or receiver device 405) performs operations associated with DFT-S-OFDM pre-equalization.

As shown in FIG. 8, in some aspects, process 800 may include receiving, from a UE, a pre-equalized DFT-S-OFDM waveform associated with a MIMO communication system, the pre-equalized DFT-S-OFDM waveform being pre-equalized in accordance with an MMSE pre-equalization (block 810). For example, the receiver device (such as by using communication manager 150 or reception component 1002, depicted in FIG. 10) may receive, from a UE, a pre-equalized DFT-S-OFDM waveform associated with a MIMO communication system, the pre-equalized DFT-S-OFDM waveform being pre-equalized in accordance with an MMSE pre-equalization, as described above.

As further shown in FIG. 8, in some aspects, process 800 may include processing the pre-equalized DFT-S-OFDM waveform (block 820). For example, the receiver device (such as by using communication manager 150 or processing component 1008, depicted in FIG. 10) may process the pre-equalized DFT-S-OFDM waveform, as described above.

Process 800 may include additional aspects, such as any single aspect or any combination of aspects described below or in connection with one or more other processes described elsewhere herein.

In a first additional aspect, processing the pre-equalized DFT-S-OFDM waveform comprises processing the pre-equalized DFT-S-OFDM waveform without performing a fast Fourier transform or an inverse discrete Fourier transform.

In a second additional aspect, alone or in combination with the first aspect, the MMSE pre-equalization is associated with channel state information for a channel between the UE and the receiver device, a thermal noise characteristic associated with the receiver device, a stationary interference characteristic associated with the receiver device, and a receiver noise value.

In a third additional aspect, alone or in combination with one or more of the first and second aspects, process 800 includes transmitting, to the UE, an indication of the receiver noise value.

In a fourth additional aspect, alone or in combination with one or more of the first through third aspects, process 800 includes obtaining, by the receiver device, an indication that a precoding size of a DFT performed at the receiver device is equal to a size of an IFFT performed at the UE.

In a fifth additional aspect, alone or in combination with one or more of the first through fourth aspects, process 800 includes receiving, from the UE, radio resource control information that indicates that the precoding size of the DFT performed at the receiver device is to be equal to the size of the IFFT performed at the UE.

In a sixth additional aspect, alone or in combination with one or more of the first through fifth aspects, process 800 includes receiving, from the UE, an LLR scaling factor associated with the pre-equalized DFT-S-OFDM waveform.

In a seventh additional aspect, alone or in combination with one or more of the first through sixth aspects, receiving the LLR scaling factor comprises receiving the LLR scaling factor for each resource element of a plurality of resource elements or for each physical resource group of a plurality of physical resource groups.

In an eighth additional aspect, alone or in combination with one or more of the first through seventh aspects, receiving the LLR scaling factor comprises receiving the LLR scaling factor for each layer of a plurality of layers.

In a ninth additional aspect, alone or in combination with one or more of the first through eighth aspects, receiving the LLR scaling factor comprises receiving the LLR scaling factor, via downlink control information associated with a first resource allocation after a refresh operation, for each channel state information indication of a plurality of channel state information indications or for each equalizer refresh operation of a plurality of equalizer refresh operations.

In a tenth additional aspect, alone or in combination with one or more of the first through ninth aspects, process 800 includes transmitting, to the UE, information that enables the UE to apply the MMSE pre-equalization to a DFT-S-OFDM waveform, wherein the information that enables the UE to apply the MMSE pre-equalization to the DFT-S-OFDM waveform comprises at least one of channel state information or a receiver noise value measurement.

In an eleventh additional aspect, alone or in combination with one or more of the first through tenth aspects, process 800 includes receiving, from the UE, information associated with the processing of the pre-equalized DFT-S-OFDM waveform, wherein the information comprises at least one of a receiver device sample scaling indication, a spatial layer unbiasing indication, or a log-likelihood ratio scaling factor indication.

In a twelfth additional aspect, alone or in combination with one or more of the first through eleventh aspects, process 800 includes receiving, from the UE, an indication to process the information associated in accordance with one or more local measurements performed by the receiver device.

In a thirteenth additional aspect, alone or in combination with one or more of the first through twelfth aspects, the MMSE pre-equalization is a THP-based MMSE pre-equalization.

In a fourteenth additional aspect, alone or in combination with one or more of the first through thirteenth aspects, the receiver device is an extended reality device.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
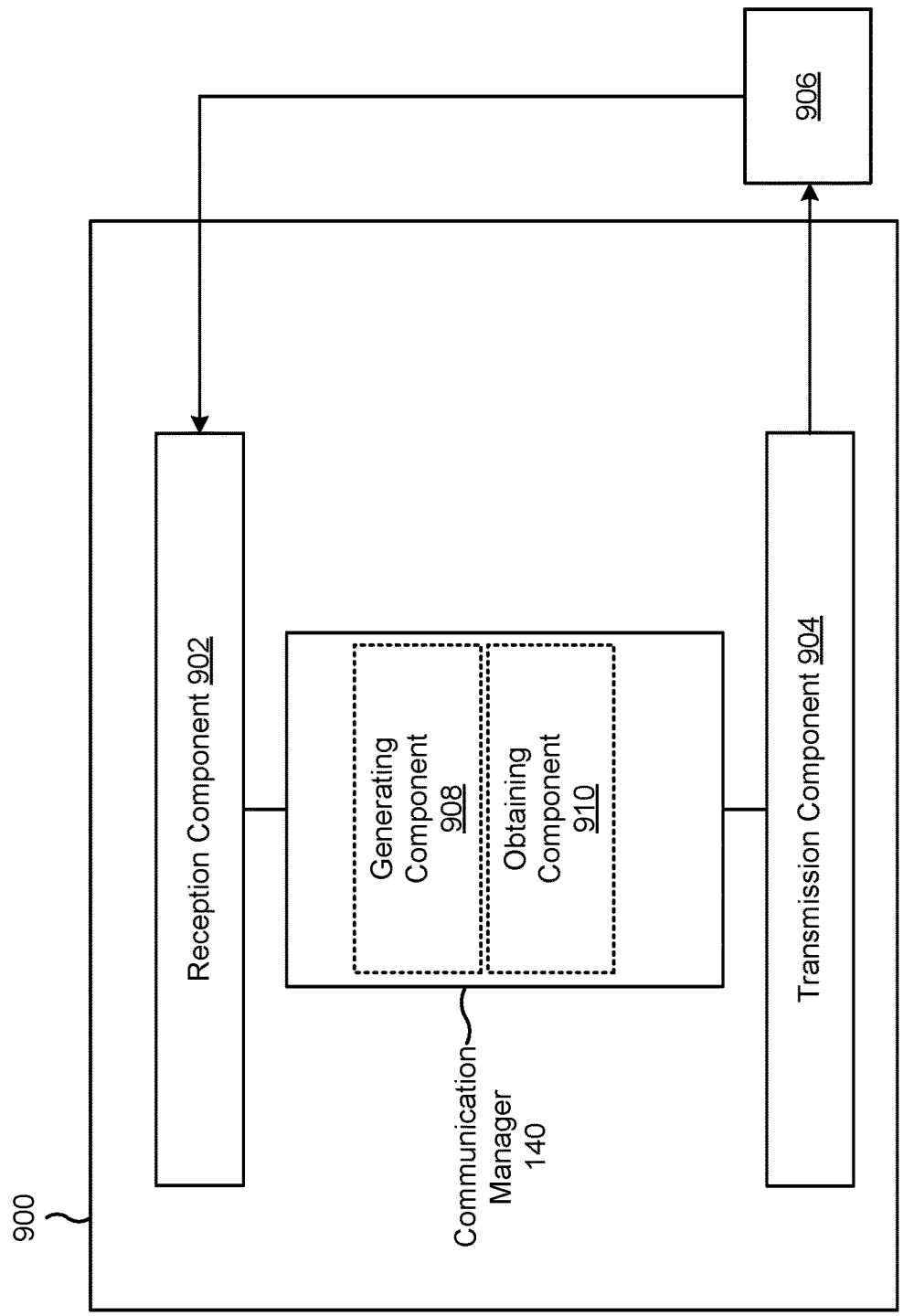
FIG. 9 is a diagram of an example apparatus for wireless communication that supports wireless communications in accordance with the present disclosure.

FIG. 9 is a diagram of an example apparatus 900 for wireless communication that supports wireless communications in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to or operable to perform one or more operations described herein in connection with FIGS. 4-6. Additionally or alternatively, the apparatus 900 may be configured to or operable to perform one or more processes described herein, such as process 700 of FIG. 7. In some aspects, the apparatus 900 may include one or more components of the UE described above in connection with FIG. 2.

The reception component 902 may receive communications, such as reference signals, control information, or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, or a memory of the UE described above in connection with FIG. 2.

The transmission component 904 may transmit communications, such as reference signals, control information, or data communications, to the apparatus 906. In some aspects, the communication manager 140 may generate communications and May transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, or a memory of the UE described above in connection with FIG. 2. In some aspects, the transmission component 904 may be co-located with the reception component 902 in a transceiver.

The communication manager 140 may generate a pre-equalized DFT-S-OFDM waveform associated with a MIMO communication system in accordance with applying an MMSE pre-equalization to a DFT-S-OFDM waveform. The communication manager 140 may transmit or may cause the transmission component 904 to transmit, to a receiver device, the pre-equalized DFT-S-OFDM waveform. In some aspects, the communication manager 140 may perform one or more operations described elsewhere herein as being performed by one or more components of the communication manager 140.

The communication manager 140 may include a controller/processor, or a memory of the UE described above in connection with FIG. 2. In some aspects, the communication manager 140 includes a set of components, such as a generating component 908, or an obtaining component 910. Alternatively, the set of components may be separate and distinct from the communication manager 140. In some aspects, one or more components of the set of components may include or may be implemented within a controller/processor, or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The generating component 908 may generate a pre-equalized DFT-S-OFDM waveform associated with a MIMO communication system in accordance with applying an MMSE pre-equalization to a DFT-S-OFDM waveform. The transmission component 904 may transmit, to a receiver device, the pre-equalized DFT-S-OFDM waveform. The reception component 902 may receive, from the receiver device, an indication of the receiver noise value. The obtaining component 910 may obtain an indication that a size of an IFFT performed at the UE is to be equal to a precoding size of a DFT performed at the receiver device. The transmission component 904 may transmit, to the receiver device, radio resource control information that indicates that the size of the IFFT performed at the UE is to be equal to the precoding size of the DFT performed at the receiver device. The transmission component 904 may transmit, to the receiver device, an LLR scaling factor associated with the pre-equalized DFT-S-OFDM waveform. The obtaining component 910 may obtain capability information that indicates MMSE pre-equalization capabilities associated with a pairing between the UE and the receiver device, wherein applying the MMSE pre-equalization to the DFT-S-OFDM waveform comprises applying the MMSE pre-equalization to the DFT-S-OFDM waveform in accordance with the capability information. The reception component 902 may receive, from the receiver device, information that enables the UE to apply the MMSE pre-equalization to the DFT-S-OFDM waveform, wherein the information that enables the UE to apply the MMSE pre-equalization to the DFT-S-OFDM waveform comprises at least one of channel state information or a receiver noise value measurement. The transmission component 904 may transmit, to the receiver device, information associated with a processing of the pre-equalized DFT-S-OFDM waveform by the receiver device, wherein the information comprises at least one of a receiver device sample scaling indication, a spatial layer unbiasing indication, or a log-likelihood ratio scaling factor indication. The transmission component 904 may transmit, to the receiver device, an indication for the receiver device to process the information in accordance with one or more local measurements performed by the receiver device.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
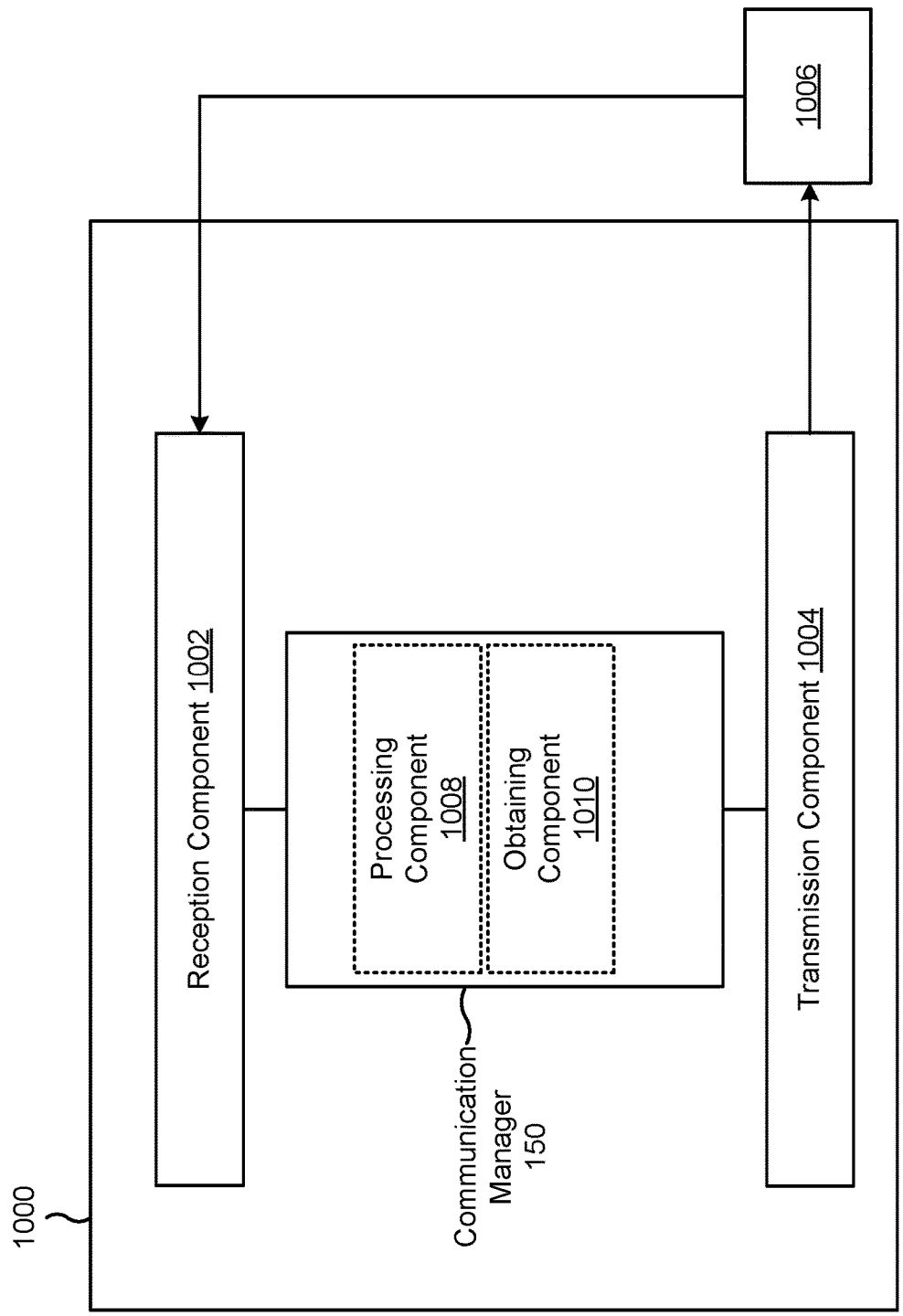
FIG. 10 is a diagram of an example apparatus for wireless communication that supports wireless communications in accordance with the present disclosure.

FIG. 10 is a diagram of an example apparatus 1000 for wireless communication that supports wireless communications in accordance with the present disclosure. The apparatus 1000 may be a receiver device, or a receiver device may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to or operable to perform one or more operations described herein in connection with FIGS. 4-6. Additionally or alternatively, the apparatus 1000 may be configured to or operable to perform one or more processes described herein, such as process 800 of FIG. 8. In some aspects, the apparatus 1000 may include one or more components of the receiver device described above in connection with FIG. 2.

The reception component 1002 may receive communications, such as reference signals, control information, or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, or a memory of the receiver device described above in connection with FIG. 2.

The transmission component 1004 may transmit communications, such as reference signals, control information, or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, or a memory of the receiver device described above in connection with FIG. 2. In some aspects, the transmission component 1004 may be co-located with the reception component 1002 in a transceiver.

The communication manager 150 may receive or may cause the reception component 1002 to receive, from a UE, a pre-equalized DFT-S-OFDM waveform associated with a MIMO communication system, the pre-equalized DFT-S-OFDM waveform being pre-equalized in accordance with an MMSE pre-equalization. The communication manager 150 may process the pre-equalized DFT-S-OFDM waveform. In some aspects, the communication manager 150 may perform one or more operations described elsewhere herein as being performed by one or more components of the communication manager 150.

The communication manager 150 may include a controller/processor, a memory, a scheduler, or a communication unit of the receiver device described above in connection with FIG. 2. In some aspects, the communication manager 150 includes a set of components, such as a processing component 1008, or an obtaining component 1010. Alternatively, the set of components may be separate and distinct from the communication manager 150. In some aspects, one or more components of the set of components may include or may be implemented within a controller/processor, a memory, a scheduler, or a communication unit of the receiver device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a UE, a pre-equalized DFT-S-OFDM waveform associated with a MIMO communication system, the pre-equalized DFT-S-OFDM waveform being pre-equalized in accordance with an MMSE pre-equalization. The processing component 1008 may process the pre-equalized DFT-S-OFDM waveform.

The transmission component 1004 may transmit, to the UE, an indication of the receiver noise value. The obtaining component 910 may obtain an indication that a precoding size of a DFT performed at the receiver device is equal to a size of an IFFT performed at the UE. The reception component 1002 may receive, from the UE, radio resource control information that indicates that the precoding size of the DFT performed at the receiver device is to be equal to the size of the IFFT performed at the UE. The reception component 1002 may receive, from the UE, an LLR scaling factor associated with the pre-equalized DFT-S-OFDM waveform. The transmission component 1004 may transmit, to the UE, information that enables the UE to apply the MMSE pre-equalization to a DFT-S-OFDM waveform, wherein the information that enables the UE to apply the MMSE pre-equalization to the DFT-S-OFDM waveform comprises at least one of channel state information or a receiver noise value measurement. The reception component 1002 may receive, from the UE, information associated with the processing of the pre-equalized DFT-S-OFDM waveform, wherein the information comprises at least one of a receiver device sample scaling indication, a spatial layer unbiasing indication, or a log-likelihood ratio scaling factor indication. The reception component 1002 may receive, from the UE, an indication to process the information associated in accordance with one or more local measurements performed by the receiver device.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method for wireless communication by a user equipment (UE), comprising: generating a pre-equalized discrete Fourier transform spread orthogonal frequency division multiplexing (DFT-S-OFDM) waveform associated with a multiple-input multiple-output (MIMO) communication system in accordance with applying a minimum mean square error (MMSE) pre-equalization to a DFT-S-OFDM waveform; and transmitting, to a receiver device, the pre-equalized DFT-S-OFDM waveform.

Aspect 2: The method of Aspect 1, wherein the MMSE pre-equalization is associated with channel state information for a channel between the UE and the receiver device, a thermal noise characteristic associated with the receiver device, a stationary interference characteristic associated with the receiver device, and a receiver noise value.

Aspect 3: The method of Aspect 2, further comprising receiving, from the receiver device, an indication of the receiver noise value.

Aspect 4: The method of any of Aspects 1-3, further comprising obtaining, by the UE, an indication that a size of an inverse fast Fourier transform (IFFT) performed at the UE is to be equal to a precoding size of a discrete Fourier transform (DFT) performed at the receiver device.

Aspect 5: The method of Aspect 4, further comprising transmitting, to the receiver device, radio resource control information that indicates that the size of the IFFT performed at the UE is to be equal to the precoding size of the DFT performed at the receiver device.

Aspect 6: The method of any of Aspects 1-5, further comprising transmitting, to the receiver device, a log-likelihood ratio (LLR) scaling factor associated with the pre-equalized DFT-S-OFDM waveform.

Aspect 7: The method of Aspect 6, wherein transmitting the LLR scaling factor comprises transmitting the LLR scaling factor for each resource element of a plurality of resource elements or for each physical resource group of a plurality of physical resource groups.

Aspect 8: The method of Aspect 6, wherein transmitting the LLR scaling factor comprises transmitting the LLR scaling factor for each layer of a plurality of layers.

Aspect 9: The method of Aspect 6, wherein transmitting the LLR scaling factor comprises transmitting the LLR scaling factor, via downlink control information associated with a first resource allocation after a refresh operation, for each channel state information indication of a plurality of channel state information indications or for each equalizer refresh operation of a plurality of equalizer refresh operations.

Aspect 10: The method of any of Aspects 1-9, further comprising obtaining capability information that indicates MMSE pre-equalization capabilities associated with a pairing between the UE and the receiver device, wherein applying the MMSE pre-equalization to the DFT-S-OFDM waveform comprises applying the MMSE pre-equalization to the DFT-S-OFDM waveform in accordance with the capability information.

Aspect 11: The method of any of Aspects 1-10, further comprising receiving, from the receiver device, information that enables the UE to apply the MMSE pre-equalization to the DFT-S-OFDM waveform, wherein the information that enables the UE to apply the MMSE pre-equalization to the DFT-S-OFDM waveform comprises at least one of channel state information or a receiver noise value measurement.

Aspect 12: The method of any of Aspects 1-11, further comprising transmitting, to the receiver device, information associated with a processing of the pre-equalized DFT-S-OFDM waveform by the receiver device, wherein the information comprises at least one of a receiver device sample scaling indication, a spatial layer unbiasing indication, or a log-likelihood ratio scaling factor indication.

Aspect 13: The method of Aspect 12, further comprising transmitting, to the receiver device, an indication for the receiver device to process the information in accordance with one or more local measurements performed by the receiver device.

Aspect 14: The method of any of Aspects 1-13, wherein the MMSE pre-equalization is a THP-based MMSE pre-equalization.

Aspect 15: The method of any of Aspects 1-14, wherein the receiver device is an extended reality device.

Aspect 16: A method for wireless communication by a receiver device, comprising: receiving, from a user equipment (UE), a pre-equalized discrete Fourier transform spread orthogonal frequency division multiplexing (DFT-S-OFDM) waveform associated with a multiple-input multiple-output (MIMO) communication system, the pre-equalized DFT-S-OFDM waveform being pre-equalized in accordance with a minimum mean square error (MMSE) pre-equalization; and processing the pre-equalized DFT-S-OFDM waveform.

Aspect 17: The method of Aspect 16, wherein processing the pre-equalized DFT-S-OFDM waveform comprises processing the pre-equalized DFT-S-OFDM waveform without performing a fast Fourier transform or an inverse discrete Fourier transform.

Aspect 18: The method of any of Aspects 16-17, wherein the MMSE pre-equalization is associated with channel state information for a channel between the UE and the receiver device, a thermal noise characteristic associated with the receiver device, a stationary interference characteristic associated with the receiver device, and a receiver noise value.

Aspect 19: The method of Aspect 18, further comprising transmitting, to the UE, an indication of the receiver noise value.

Aspect 20: The method of any of Aspects 16-19, further comprising obtaining, by the receiver device, an indication that a precoding size of a discrete Fourier transform (DFT) performed at the receiver device is equal to a size of an inverse fast Fourier transform (IFFT) performed at the UE.

Aspect 21: The method of Aspect 20, further comprising receiving, from the UE, radio resource control information that indicates that the precoding size of the DFT performed at the receiver device is to be equal to the size of the IFFT performed at the UE.

Aspect 22: The method of any of Aspects 16-21, further comprising receiving, from the UE, a log-likelihood ratio (LLR) scaling factor associated with the pre-equalized DFT-S-OFDM waveform.

Aspect 23: The method of Aspect 22, wherein receiving the LLR scaling factor comprises receiving the LLR scaling factor for each resource element of a plurality of resource elements or for each physical resource group of a plurality of physical resource groups.

Aspect 24: The method of Aspect 22, wherein receiving the LLR scaling factor comprises receiving the LLR scaling factor for each layer of a plurality of layers.

Aspect 25: The method of Aspect 22, wherein receiving the LLR scaling factor comprises receiving the LLR scaling factor, via downlink control information associated with a first resource allocation after a refresh operation, for each channel state information indication of a plurality of channel state information indications or for each equalizer refresh operation of a plurality of equalizer refresh operations.

Aspect 26: The method of any of Aspects 16-25, further comprising transmitting, to the UE, information that enables the UE to apply the MMSE pre-equalization to a DFT-S-OFDM waveform, wherein the information that enables the UE to apply the MMSE pre-equalization to the DFT-S-OFDM waveform comprises at least one of channel state information or a receiver noise value measurement.

Aspect 27: The method of any of Aspects 16-26, further comprising receiving, from the UE, information associated with the processing of the pre-equalized DFT-S-OFDM waveform, wherein the information comprises at least one of a receiver device sample scaling indication, a spatial layer unbiasing indication, or a log-likelihood ratio scaling factor indication.

Aspect 28: The method of Aspect 27, further comprising receiving, from the UE, an indication to process the information associated in accordance with one or more local measurements performed by the receiver device.

Aspect 29: The method of any of Aspects 16-28, wherein the MMSE pre-equalization is a THP-based MMSE pre-equalization.

Aspect 30: The method of any of Aspects 16-29, wherein the receiver device is an extended reality device.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a processing system that includes one or more processors and one or more memories coupled with the one or more processors, the processing system configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "or," unless explicitly stated otherwise (for example, if used in combination with "either" or "only one of").

What is claimed is:

1. A user equipment (UE) for wireless communication, the UE comprising:
a processing system that includes one or more processors and one or more memories coupled with the one or more processors, the processing system configured to cause the UE to:
generate a pre-equalized discrete Fourier transform spread orthogonal frequency division multiplexing (DFT-S-OFDM) waveform associated with a multiple-input multiple-output (MIMO) communication system in accordance with applying a minimum mean square error (MMSE) pre-equalization to a DFT-S-OFDM waveform, the generation of the pre-equalized DFT-S-OFDM waveform including performing an inverse fast Fourier transform (IFFT) having a size that corresponds to a discrete Fourier transform (DFT) for processing the pre-equalized DFT-S-OFDM waveform at a receiver device; and
transmit, to the receiver device, the pre-equalized DFT-S-OFDM waveform.

2. The UE of claim 1, wherein the MMSE pre-equalization is associated with channel state information for a channel between the UE and the receiver device, a thermal noise characteristic associated with the receiver device, a stationary interference characteristic associated with the receiver device, and a receiver noise value.

3. The UE of claim 2, wherein the processing system is further operable to cause the UE to receive, from the receiver device, an indication of the receiver noise value.

4. The UE of claim 1, wherein the processing system is further operable to cause the UE to transmit, to the receiver device, radio resource control information that indicates that the size of the IFFT performed at the UE is to be equal to the precoding size of the DFT performed at the receiver device.

5. The UE of claim 1, wherein the processing system is further operable to cause the UE to transmit, to the receiver device, information associated with a processing of the pre-equalized DFT-S-OFDM waveform by the receiver device, wherein the information comprises at least one of a receiver device sample scaling indication, a spatial layer unbiasing indication, or a log-likelihood ratio scaling factor indication.

6. The UE of claim 5, wherein the processing system is further operable to cause the UE to transmit, to the receiver device, an indication for the receiver device to process the information in accordance with one or more local measurements performed by the receiver device.

7. The UE of claim 1, wherein the MMSE pre-equalization is a Tomlinson-Harashima precoder (THP)-based MMSE pre-equalization.

8. A user equipment (UE) for wireless communication, the UE comprising:
a processing system that includes one or more processors and one or more memories coupled with the one or more processors, the processing system configured to cause the UE to:
generate a pre-equalized discrete Fourier transform spread orthogonal frequency division multiplexing (DFT-S-OFDM) waveform associated with a multiple-input multiple-output (MIMO) communication system in accordance with applying a minimum mean square error (MMSE) pre-equalization to a DFT-S-OFDM waveform;
transmit, to a receiver device, a log-likelihood ratio (LLR) scaling factor associated with the pre-equalized DFT-S-OFDM waveform; and
transmit, to the receiver device, the pre-equalized DFT-S-OFDM.

9. The UE of claim 8, wherein, to cause the UE to transmit the LLR scaling factor, the processing system is further operable to cause the UE to transmit the LLR scaling factor for each resource element of a plurality of resource elements or for each physical resource group of a plurality of physical resource groups.

10. The UE of claim 8, wherein, to cause the UE to transmit the LLR scaling factor, the processing system is further operable to cause the UE to transmit the LLR scaling factor for each layer of a plurality of layers.

11. The UE of claim 8, wherein, to cause the UE to transmit the LLR scaling factor, the processing system is further operable to cause the UE to transmit the LLR scaling factor, via downlink control information associated with a first resource allocation after a refresh operation, for each channel state information indication of a plurality of channel state information indications or for each equalizer refresh operation of a plurality of equalizer refresh operations.

12. A user equipment (UE) for wireless communication, the UE comprising:
a processing system that includes one or more processors and one or more memories coupled with the one or more processors, the processing system configured to cause the UE to:
obtain capability information that indicates minimum mean square error (MMSE) MMSE pre-equalization capabilities associated with the UE and a receiver device;
generate a pre-equalized discrete Fourier transform spread orthogonal frequency division multiplexing (DFT-S-OFDM) waveform associated with a multiple-input multiple-output (MIMO) communication system in accordance with applying an MMSE pre-equalization to a DFT-S-OFDM waveform, wherein applying the MMSE pre-equalization to the DFT-S-OFDM waveform comprises applying the MMSE pre-equalization to the DFT-S-OFDM waveform in accordance with the capability information; and
transmit, to the receiver device, the pre-equalized DFT-S-OFDM.

13. A user equipment (UE) for wireless communication, the UE comprising:
a processing system that includes one or more processors and one or more memories coupled with the one or more processors, the processing system configured to cause the UE to:
generate a pre-equalized discrete Fourier transform spread orthogonal frequency division multiplexing (DFT-S-OFDM) waveform associated with a multiple-input multiple-output (MIMO) communication system in accordance with applying a minimum mean square error (MMSE) pre-equalization to a DFT-S-OFDM waveform;
receive, from a receiver device, information that enables the UE to apply the MMSE pre-equalization to the DFT-S-OFDM waveform, wherein the information that enables the UE to apply the MMSE pre-equalization to the DFT-S-OFDM waveform comprises at least one of channel state information or a receiver noise value measurement; and
transmit, to the receiver device, the pre-equalized DFT-S-OFDM.

14. A receiver device for wireless communication, the receiver device comprising:
a processing system that includes one or more processors and one or more memories coupled with the one or more processors, the processing system configured to cause the receiver device to:
receive, from a user equipment (UE), a pre-equalized discrete Fourier transform spread orthogonal frequency division multiplexing (DFT-S-OFDM) waveform associated with a multiple-input multiple-output (MIMO) communication system, the pre-equalized DFT-S-OFDM waveform being pre-equalized in accordance with a minimum mean square error (MMSE) pre-equalization; and
process the pre-equalized DFT-S-OFDM waveform, the processing of the pre-equalized DFT-S-OFDM waveform including performing a discrete Fourier transform (DFT) having a size that corresponds to an inverse fast Fourier transform (IFFT) for generating the pre-equalized DFT-S-OFDM waveform at the UE.

15. The receiver device of claim 14, wherein, to cause the receiver device to process the pre-equalized DFT-S-OFDM waveform, the processing system is further operable to cause the receiver device to process the pre-equalized DFT-S-OFDM waveform without performing a fast Fourier transform or an inverse discrete Fourier transform.

16. The receiver device of claim 14, wherein the MMSE pre-equalization is associated with channel state information for a channel between the UE and the receiver device, a thermal noise characteristic associated with the receiver device, a stationary interference characteristic associated with the receiver device, and a receiver noise value.

17. The receiver device of claim 16, wherein the processing system is further operable to cause the receiver device to transmit, to the UE, an indication of the receiver noise value.

18. The receiver device of claim 14, wherein the processing system is further operable to cause the receiver device to obtain an indication that a precoding size of the DFT at the receiver device is equal to the size of the IFFT at the UE.

19. The receiver device of claim 18, wherein the processing system is further operable to cause the receiver device to receive, from the UE, radio resource control information that indicates that the precoding size of the DFT performed at the receiver device is to be equal to the size of the IFFT performed at the UE.

20. The receiver device of claim 14, wherein the processing system is further operable to cause the receiver device to receive, from the UE, information associated with the processing of the pre-equalized DFT-S-OFDM waveform, wherein the information comprises at least one of a receiver device sample scaling indication, a spatial layer unbiasing indication, or a log-likelihood ratio scaling factor indication.

21. The receiver device of claim 20, wherein the processing system is further operable to cause the receiver device to receive, from the UE, an indication to process the information associated in accordance with one or more local measurements performed by the receiver device.

22. The receiver device of claim 14, wherein the MMSE pre-equalization is a Tomlinson-Harashima precoder (THP)-based MMSE pre-equalization.

23. A receiver device for wireless communication, the receiver device comprising:
a processing system that includes one or more processors and one or more memories coupled with the one or more processors, the processing system configured to cause the receiver device to:
receive, from a user equipment (UE), a pre-equalized discrete Fourier transform spread orthogonal frequency division multiplexing (DFT-S-OFDM) waveform associated with a multiple-input multiple-output (MIMO) communication system, the pre-equalized DFT-S-OFDM waveform being pre-equalized in accordance with a minimum mean square error (MMSE) pre-equalization;
to receive, from the UE, a log-likelihood ratio (LLR) scaling factor associated with the pre-equalized DFT-S-OFDM waveform; and
process the pre-equalized DFT-S-OFDM waveform.

24. The receiver device of claim 23, wherein, to cause the receiver device to receive the LLR scaling factor, the processing system is further operable to cause the receiver device to receive the LLR scaling factor for each resource element of a plurality of resource elements or for each physical resource group of a plurality of physical resource groups.

25. The receiver device of claim 23, wherein, to cause the receiver device to receive the LLR scaling factor, the processing system is further operable to cause the receiver device to receive the LLR scaling factor for each layer of a plurality of layers.

26. The receiver device of claim 23, wherein, to cause the receiver device to receive the LLR scaling factor, the processing system is further operable to cause the receiver device to receive the LLR scaling factor, via downlink control information associated with a first resource allocation after a refresh operation, for each channel state information indication of a plurality of channel state information indications or for each equalizer refresh operation of a plurality of equalizer refresh operations.

27. A receiver device for wireless communication, the receiver device comprising:
   a processing system that includes one or more processors and one or more memories coupled with the one or more processors, the processing system configured to cause the receiver device to:
      transmit, to a user equipment (UE), the UE, information that enables the UE to apply a minimum mean square error (MMSE) the MMSE pre-equalization to a discrete Fourier transform spread orthogonal frequency division multiplexing (DFT-S-OFDM) waveform associated with a multiple-input multiple-output (MIMO) communication system, DFT-S-OFDM waveform, wherein the information that enables the UE to apply the MMSE pre-equalization to the DFT-S-OFDM waveform comprises at least one of channel state information or a receiver noise value measurement; and
      receive, from the UE, a pre-equalized DFT-S-OFDM waveform, the pre-equalized DFT-S-OFDM waveform being pre-equalized in accordance with the information and the MMSE pre-equalization.

28. A method for wireless communication by a user equipment (UE), the method comprising:
   generating a pre-equalized discrete Fourier transform spread orthogonal frequency division multiplexing (DFT-S-OFDM) waveform associated with a multiple-input multiple-output (MIMO) communication system in accordance with applying a minimum mean square error (MMSE) pre-equalization to a DFT-S-OFDM waveform, the generation of the pre-equalized DFT-S-OFDM waveform including performing an inverse fast Fourier transform (IFFT) having a size that corresponds to a discrete Fourier transform (DFT) for processing the pre-equalized DFT-S-OFDM waveform at a receiver device; and
   transmitting, to a receiver device, the pre-equalized DFT-S-OFDM waveform.

29. A method for wireless communication by a receiver device, the method comprising:
   receiving, from a user equipment (UE), a pre-equalized discrete Fourier transform spread orthogonal frequency division multiplexing (DFT-S-OFDM) waveform associated with a multiple-input multiple-output (MIMO) communication system, the pre-equalized DFT-S-OFDM waveform being pre-equalized in accordance with a minimum mean square error (MMSE) pre-equalization; and
   processing the pre-equalized DFT-S-OFDM waveform, the processing of the pre-equalized DFT-S-OFDM waveform including performing a discrete Fourier transform (DFT) having a size that corresponds to an inverse fast Fourier transform (IFFT) for generating the pre-equalized DFT-S-OFDM waveform at the UE.

* * * * *